May 29, 1956 — S. B. SWENHOLT — 2,747,823
HOSE RACK
Filed June 28, 1951

INVENTOR.
Sophie B. Swenholt.
BY
Wood, Herron & Evans.
ATTORNEYS.

United States Patent Office 2,747,823
Patented May 29, 1956

2,747,823
HOSE RACK

Sophie B. Swenholt, Tucson, Ariz.

Application June 28, 1951, Serial No. 234,063

1 Claim. (Cl. 248—85)

This invention relates to racks for the storage of lengths of garden hose and is particularly directed to a novel portable rack fabricated from continuous bar stock.

During many months of the year the ordinary garden hose is used at frequent intervals to water the lawn and gardens, wash the automobile and to perform many similar tasks. It is a common practice to store the hose near a water faucet or at some other convenient point, rather than return it to its permanent storage place in the garage or basement, after each use.

In the past, two methods of temporary storage were used; either the hose was coiled upon the ground or wound over a hose reel or some similar device. Both of these methods present difficulties which are avoided by the present invention which contemplates a portable rack upon which the hose may be coiled and supported free from contact with the ground.

The simplest of the storage methods previously used, coiling the hose upon the ground, does have the advantage that no rack or reel is needed and the coil may be placed anywhere without moving a storage device from place to place. However, coiling a hose directly upon the ground has several serious drawbacks which tend to make it an undesirable method of storing a hose. In the first place, if the hose is placed directly upon the ground it has a greater tendency to deteriorate or become damaged by scuffing, cutting etc. than when it is supported free from the ground where it can dry out more readily and where it is at least partially protected from contact with such things as lawn mowers, rakes and garden tools. Furthermore, a hose which is laid upon the ground will quickly kill the grass or flowers upon which it is placed. Finally, no matter how carefully a hose is coiled, if it is not done over some supporting structure it is almost impossible to uncoil the hose without causing many kinks and knots which must be taken out before the hose can be used.

Winding the hose upon a reel, especially the portable type mounted upon wheels, is a satisfactory way to store a hose during the period when it is not being used. Such a reel is relatively expensive, however, and not nearly so simple to manufacture or use as the novel rack herein disclosed. Furthermore, due to the tracks which are left by the wheels, supporting the heavy reel assembly, the device is not adapted to be placed within the borders of a garden, as might be desirable if there is a garden along the wall under a faucet for example. Another consideration is that if the length of hose to be stored is near the reel's capacity, it is necessary that the hose be carefully wound about the reel, with each spiral adjacent the preceding one, or the entire length of hose will not fit upon the reel or the reel will become jammed when the hose is being unwound.

The present invention seeks to remedy these shortcomings and is predicated upon the concept of bending a length of bar into a configuration about which a hose may be coiled and supported free from contact with the ground. Such a construction combines the desiderata of extreme simplicity, strength, compactness and portability. More specifically, the hose rack which is the subject of the present invention comprises a continuous bar which is bent to form a plurality of uprights or legs, the portion of bar intermediate the upper ends of adjoining legs being configurated to form a cradle adapted to receive the coils of hose and support them free from contact with the ground.

The leg and cradle arrangement described provides a firm structure about which the garden hose may easily be coiled and which permits it to be uncoiled without forming any kinks or knots while at the same time making it unnecessary to coil the hose carefully as is the case with some reels. Furthermore, the legs carrying the cradle require only a small space for their contact with the ground, and since the hose is supported at a substantial height above the ground, the rack may be placed in a flower garden without disturbing any of the flowers or plants which are planted within it.

An object of this invention therefore, is to provide a hose rack, adapted to support a coiled length of hose, which may be fabricated from a continuous length of bar.

Another object of this invention is to provide a hose rack which is of the utmost simplicity and which may be inexpensively produced.

A further object of this invention is to provide a hose rack which is light and compact and which may readily be carried from place to place.

An additional object of this invention is to provide a hose rack which will be very stable when set up so that it will resist overturning especially when the hose is being coiled or uncoiled.

These and other objects of this invention will be apparent from a consideration of the specification and drawings in which.

Figure 1:
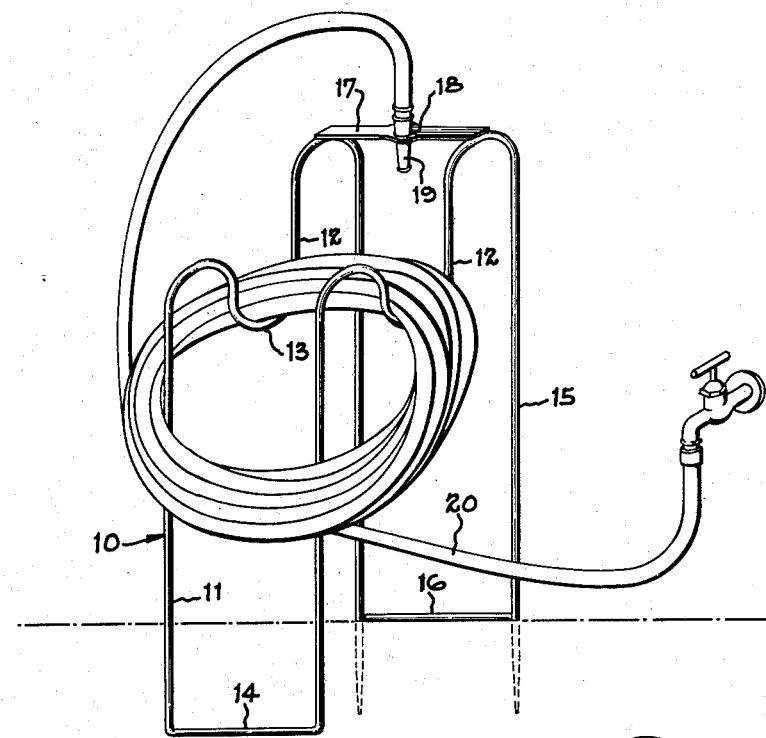
Figure 1 is a perspective view of a rack having a length of hose coiled around it.
Figure 3:
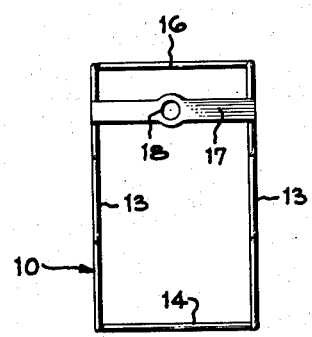
Figure 3 is a top elevational view of the rack.
Figure 2:
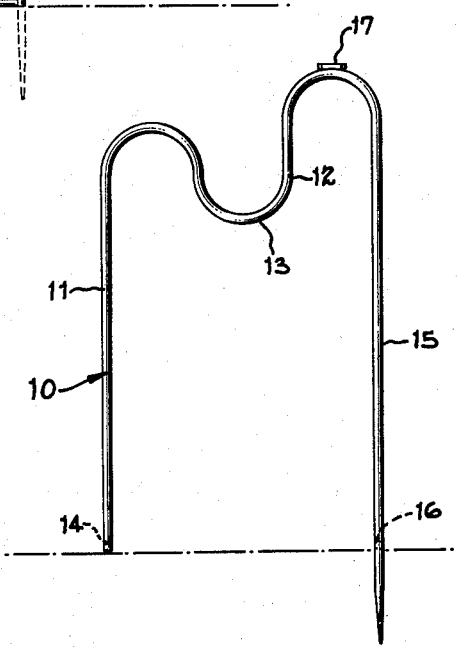
Figure 2 is a side elevation of the rack showing the relationship of the legs with the cradle.

As shown in the drawings, the rack comprises a continuous bar 10 which is shaped to form four uprights or legs 11 with two pairs of adjacent legs being joined at their upper ends by a portion of bar 12 configurated to form a cradle 13.

The material from which the rack is fabricated is generally described as a bar, but it will be understood that any rod, pipe, band or similarly shaped length of material may be used, it being necessary only that the rod or whatever is used possess a considerable rigidity after it has been shaped to form the rack.

In the preferred embodiment of the invention, the uprights, or legs formed from the two ends of the rod are constructed longer than the legs formed from the intermediate portion of the bar, which are joined along their lower ends to form the front support 14. Furthermore, the ends of the rod which form the lower portion of the rear legs 15 are preferably sharpened or pointed so that they may be easily inserted into the ground to provide a more stable base for the rack, rendering it less likely to be pulled or overturned when the hose is being coiled or uncoiled.

Also in the preferred embodiment, a cross brace or stop 16 is secured to the two rear legs 15 at a point spaced from their lower ends. The cross brace serves to rigidify the structure and further functions to control the depth to which the rear legs may be inserted into the ground. A second brace 17 is secured to the upper ends of the two rear legs. This brace functions not only to strengthen the structure but also is provided with an opening 18 into which the nozzle 19 of the hose 20 may be placed when the hose is coiled about the cradle 13, thus rendering the nozzle readily accessible when it is desired to uncoil the hose.

In use the rack, which is extremely light and easy to carry, may be set up at any convenient place, for instance, adjacent a water faucet as shown in Figure 1. The rear legs 15 are pressed into the ground until the stop 16 prevents further insertion at which time the rack is firmly seated and will be very resistant to being pulled or overturned. The hose may then be coiled by passing it in front of the fore legs over the cradle around in front of the legs, back over the cradle and so forth until the entire length of hose has been coiled around and is supported by the cradle formed by the portion of rod adjoining the two pairs of legs. Finally, the nozzle which is secured to the end of the last coil of hose is inserted into the opening provided in the upper brace. By inserting the nozzle into the aperture provided in the upper brace it is held readily accessible until the hose is to be unwound and further prevents any accident uncoiling of the hose during storage.

It will be understood that the embodiment disclosed is merely the preferred one and that many modifications may be made with the scope and spirit of the invention. For instance, while four legs are shown forming a generally rectangular supporting structure, it is to be understood that the upright members may be so arranged that they form any sort of a base structuer which will afford a support for the cradle about which the hose is to be coiled. It will also be understod that a spike may be provided on only one end of the rod or that both ends may be cut at the same length as the uprights formed from the intermediate portion of the bar, so that no portion of the rear legs, formed from the bar ends need be inserted into the ground. Furthermore, either or both of the cross braces shown may be omitted. Additionally, while in the preferred embodiment the rack is shown as being constructed from a continuous bar, it is also feasible to bend shorter lengths into shape and then assemble them, as by welding, to form a completed rack.

Having described my invention, I claim:

A hose rack for supporting a hose free from contact with the ground, said rack comprising a bar having two legs formed from the ends thereof, and other legs formed from the intermediate portion thereof, segments of said bar joining the legs formed from the ends of said bar with the legs formed from the intermediate portion thereof, said segments of the bar forming an upwardly facing U-shaped cradle adapted to support a coiled hose, the lowermost portion of said cradle being spaced a substantial distance from the bottoms of said legs, the legs formed from the ends of said bar being longer than the legs formed from the intermediate portion thereof, whereby said legs formed from the ends of said bar may be inserted into the ground to form a stable base for said rack, a brace secured to the lower portion of each of the legs formed from the ends of the bar and spaced from the ends of said bar, said brace being adapted to limit the distance, said legs may be inserted into the ground.

References Cited in the file of this patent

UNITED STATES PATENTS

| | | |
|---|---|---|
| D. 165,358 | Baldwin | Dec. 11, 1951 |
| 509,187 | Unkefer | Nov. 21, 1893 |
| 1,058,090 | Nelson | Apr. 8, 1913 |
| 1,061,431 | West | May 13, 1913 |
| 1,348,807 | Kivlan | Aug. 3, 1920 |
| 1,830,769 | Rothermel | Nov. 10, 1931 |
| 1,831,306 | Kakimoto | Nov. 10, 1931 |
| 1,903,085 | Barnes | Mar. 28, 1933 |
| 1,904,063 | Lund | Apr. 18, 1933 |
| 1,992,203 | Gabrielson | Feb. 26, 1935 |
| 2,110,158 | Keeler | Mar. 8, 1938 |
| 2,140,045 | Bergstrom | Dec. 13, 1938 |
| 2,480,018 | Greenberg | Aug. 23, 1949 |
| 2,661,921 | Brusten | Dec. 8, 1953 |